(12) United States Patent
Strandby et al.

(10) Patent No.: US 11,563,961 B2
(45) Date of Patent: Jan. 24, 2023

(54) LOAD BALANCING METHOD FOR VIDEO DECODING IN A SYSTEM PROVIDING HARDWARE AND SOFTWARE DECODING RESOURCES

(71) Applicant: CANON KABUSHIKI KAISHA, Tokyo (JP)

(72) Inventors: Kristine Strandby, Espergaerde (DK); Jeppe Jensen, Rodovre (DK); Arthur Magaljan, Taastrup (DK)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/059,181

(22) PCT Filed: May 30, 2019

(86) PCT No.: PCT/EP2019/064140
§ 371 (c)(1),
(2) Date: Nov. 25, 2020

(87) PCT Pub. No.: WO2019/229213
PCT Pub. Date: Dec. 5, 2019

(65) Prior Publication Data
US 2021/0321123 A1    Oct. 14, 2021

(30) Foreign Application Priority Data

Jun. 1, 2018   (EP) ..................................... 18175601
Sep. 28, 2018  (GB) ..................................... 1815853

(51) Int. Cl.
*H04N 19/42*   (2014.01)
*H04N 19/44*   (2014.01)
*H04N 7/18*    (2006.01)

(52) U.S. Cl.
CPC .............. *H04N 19/42* (2014.11); *H04N 7/18* (2013.01); *H04N 19/44* (2014.11)

(58) Field of Classification Search
CPC .... H04N 19/42; H04N 19/436; H04N 19/127; H04N 19/156; H04N 7/18; H04N 19/44;
(Continued)

(56) References Cited

U.S. PATENT DOCUMENTS

| 8,213,518 | B1 * | 7/2012 | Wang ................... H04N 19/436 375/240.25 |
| 8,675,739 | B2 * | 3/2014 | Baik ...................... H04N 19/44 375/240.25 |

(Continued)

OTHER PUBLICATIONS

Rui Cheng, et al., A Cloud-based Transcoding Framework for Real-time Mobile Video Conferencing System, 2014 2nd IEEE International Conference on Mobile Cloud Computing, Services, and Engineering, Apr. 8, 2014, pp. 236-245, IEEE Computer Society, XP032605941.

(Continued)

*Primary Examiner* — Boubacar Abdou Tchoussou
(74) *Attorney, Agent, or Firm* — Canon U.S.A., Inc. IP Division

(57) ABSTRACT

A load balancing method for video decoding. The load balancing includes first determining which hardware devices are suitable for the new decoding process, and determining the current load of each of the suitable hardware devices. From the suitable devices potential devices are selected having a current load less than a threshold and overloaded devices are selected having a load greater than or equal to the threshold. If there are no suitable devices, then the decoding process is implemented by software decoding. If the list of potential hardware devices includes only one potential hardware device, then the decoding process is implemented on the hardware device. If the list of potential hardware devices includes more than one potential hardware device, then it is determined how many decoding processes are currently running on each potential hardware device, and (Continued)

the new decoding process is implemented on the potential hardware device having the fewest processes.

16 Claims, 8 Drawing Sheets

(58) Field of Classification Search
CPC ....... H04N 7/181; G06F 9/5044; G06F 9/505; G06F 9/5055; G06T 1/20
See application file for complete search history.

(56) References Cited

U.S. PATENT DOCUMENTS

| | | | |
|---|---|---|---|
| 9,525,871 B2* | 12/2016 | Neubrand | H04N 21/42607 |
| 9,693,071 B1 | 6/2017 | Lin et al. | |
| 10,542,233 B2* | 1/2020 | Slupik | H04N 7/0122 |
| 10,855,996 B2* | 12/2020 | Amini | H04L 5/0053 |
| 2009/0109230 A1 | 4/2009 | Miller et al. | |
| 2009/0154572 A1* | 6/2009 | Baik | H04N 19/436 |
| | | | 375/240.25 |
| 2011/0248986 A1* | 10/2011 | Neubrand | H04N 19/44 |
| | | | 345/418 |
| 2016/0119572 A1* | 4/2016 | Slupik | H04N 7/181 |
| | | | 348/445 |
| 2019/0260987 A1* | 8/2019 | Amini | G08B 3/10 |

OTHER PUBLICATIONS

Adarsha Rao, et al., USHA:Unified Software and Hardware Architecture for Video Decoding, Jun. 5, 2011, pp. 30-37, 2011 IEEE 9th Symposium on Application Specific Processors (SASP), XP031956448.

* cited by examiner

LOAD BALANCING METHOD FOR VIDEO DECODING IN A SYSTEM PROVIDING HARDWARE AND SOFTWARE DECODING RESOURCES

CROSS-REFERENCE TO RELATED APPLICATIONS

The application is the National Phase application of PCT Application No. PCT/EP2019/064140, filed on 30 May 2019 and titled "A Load Balancing Method For Video Decoding In A System Providing Hardware And Software Decoding Resources". This application claims the benefit under 35 U.S.C. § 119(a)-(d) of United Kingdom Patent Application No. 1815853.5, filed on 28 Sep. 2018 and titled "A Load Balancing Method For Video Decoding In A System Providing Hardware And Software Decoding Resources", and European Patent Application No. 18175601.6, filed on 1 Jun. 2018 and titled "A Load Balancing Method For Video Decoding In A System Providing Hardware And Software Decoding Resources". The above cited patent applications are incorporated herein by reference in their entirety.

TECHNICAL FIELD OF THE INVENTION

The present invention relates to a load balancing method for video decoding in a system having both software and hardware decoding resources. The hardware resources are in the form of a plurality of hardware devices, and the software decoding is carried out in a CPU. The present invention is particularly applicable in a video surveillance system.

BACKGROUND OF THE INVENTION

In a video surveillance system, it is necessary for multiple streams of video data to be decoded simultaneously. This can occur, for example, in a client device which is receiving streams of encoded video data from multiple cameras in order to display multiple streams simultaneously to an operator. This can also occur in a recording server or an analytics server which may be decoding multiple streams of video data from multiple cameras in order to perform video analytics such as motion detection or facial recognition. This can also occur in a mobile server which may decode video and encode it in another format or at a lower quality level for streaming to mobile devices.

A recording server or a client device will include a CPU, and video decoding can be carried out by software running on the CPU. However, video decoding can be carried out more efficiently by hardware devices such as GPUs (graphic processing units). Therefore, the efficiency of video decoding can be improved by providing hardware acceleration ie providing a plurality of hardware devices dedicated to video decoding. Hardware acceleration also increases the number of streams that can be decoded and displayed.

Different hardware devices might have different capabilities, both in terms of speed and capacity but also in their capability to decode different codec standards (eg JPEG, H.264 or H.265).

In any video surveillance system, the number of streams being decoded is constantly changing as an operator might switch views to display streams from different cameras, or cameras might stop and start streaming video triggered by motion detection.

Therefore, in a hardware accelerated system including a plurality of hardware decoders and resources for software decoding, there is a need for logic to efficiently allocate the decoding loads between the various hardware devices and the software, and to dynamically balance the loads during runtime.

SUMMARY OF THE INVENTION

According to a first aspect of the present invention there is provided a load balancing method for video decoding.

The present invention provides a method which distributes new decoding processes amongst the hardware and software resources taking into account which hardware devices are suitable for the processes whilst prioritising the use of hardware resources.

Since the present invention can be implemented in software, the present invention can be embodied as computer readable code for provision to a programmable apparatus on any suitable carrier medium. A tangible carrier medium may comprise a storage medium such as a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the present invention will now be described, by way of example only, with reference to the accompanying drawings in which.

DETAILED DESCRIPTION OF THE INVENTION

Figure 1:
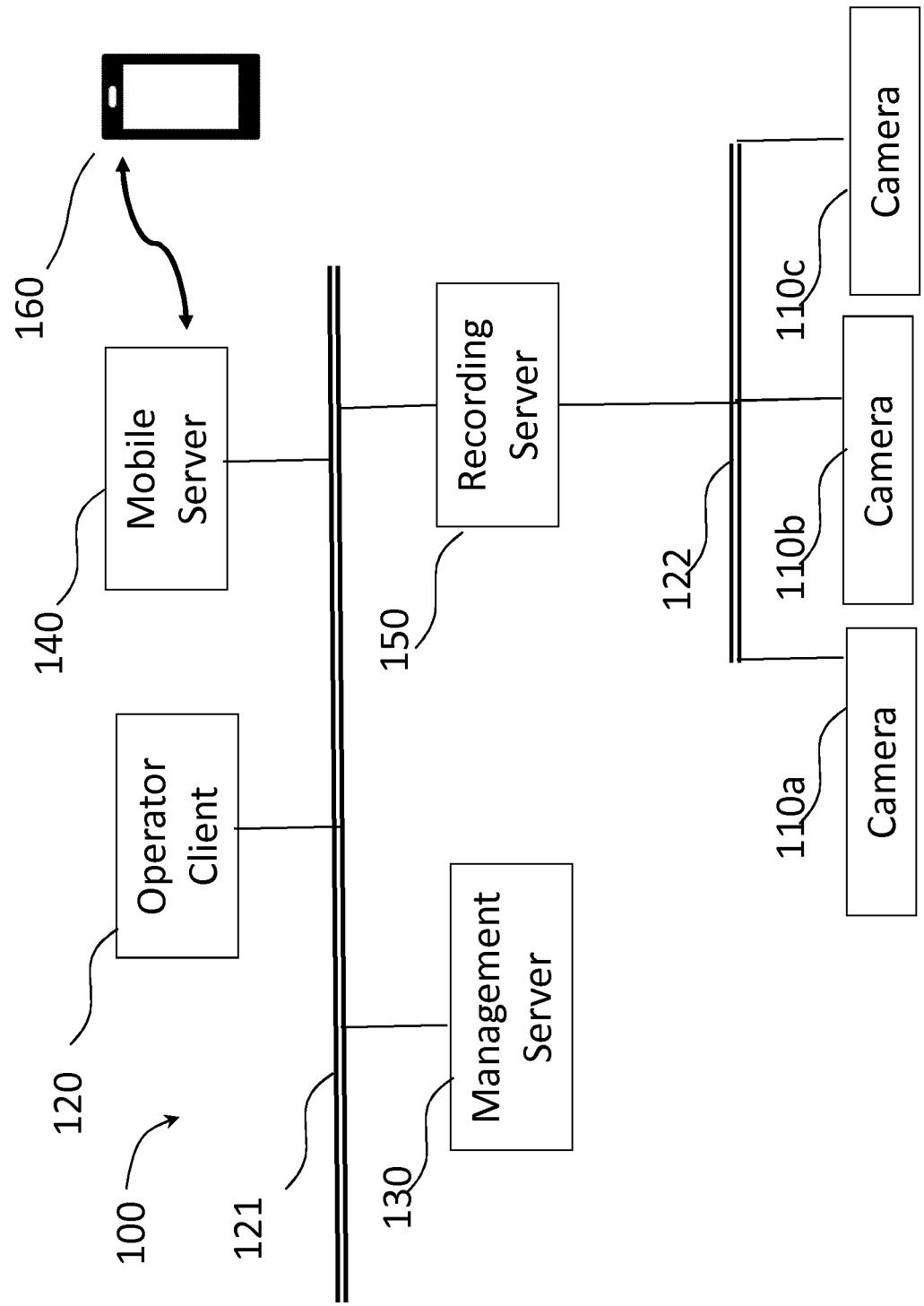
FIG. 1 illustrates an example of a video surveillance system.

FIG. 1 shows an example of a video surveillance system 100 in which embodiments of the invention can be implemented. The system 100 comprises a management server 130, a recording server 150 and a mobile server 140. Further servers may also be included, such as further recording servers, archive servers or analytics servers. A plurality of video surveillance cameras 110a, 110b, 110c send video data to the recording server 150. An operator client 120 is a fixed terminal which provides an interface via which an operator can view video data live from the cameras 110a, 110b, 110c, or recorded video data from the recording server 150.

The cameras 110a, 110b, 110c capture image data and send this to the recording server 150 as a plurality of video data streams.

The recording server 150 stores the video data streams captured by the video cameras 110a, 110b, 110c. Video data is streamed from the recording server to the operator client 120 depending on which live streams or recorded streams are selected by an operator.

The mobile server 140 communicates with a user device 160 which is a mobile device such as a smartphone or tablet which has a touch screen display. The user device 160 can access the system from a browser using a web client. Via the user device 160 and the mobile server 140, a user can view recorded video data stored on the recording server 150. The user can also view a live feed via the user device 160.

Other servers may also be present in the system 100. For example, an archiving server (not illustrated) may be provided for archiving older data stored in the recording server 150 which does not need to be immediately accessible from the recording server 150, but which it is not desired to be deleted permanently. A fail-over recording server (not illustrated) may be provided in case a main recording server fails. An analytics server can also run analytics software for image analysis, for example motion or object detection, facial recognition, event detection.

The operator client 120 and the mobile server 140 are configured to communicate via a first network/bus 121 with the management server 130 and the recording server 150. The recording server 150 communicates with the cameras 110a, 110b, 110c via a second network/bus 122.

The cameras 110a, 110b, 110c are configured to capture a video and encode the captured video by means of a video encoder. The video encoder may implement motion compensation, i.e. exploiting the temporal redundancy in a video, and deliver compressed video data to the recording server 150. Video data can be compressed with different compression levels, e.g. highly-compressed (lower quality) and less-compressed (higher quality) videos.

Video encoders without motion compensation may implement, for example, the M-JPEG standard. Video encoders using motion compensation may implement for example one of the MPEG standards (MPEG-1, H.262/MPEG-2, H.263, H.264/MPEG-4 AVC or H.265/HEVC). The compressed videos thus comprising a sequence of intra-coded I frames (pictures that are coded independently of all other pictures) and predicted P frames (pictures that contain motion-compensated difference information relative to previously decoded pictures). The frames are grouped into GOPs (Group Of Pictures). An I frame indicates the beginning of a GOP.

In the system of FIG. 1, decoding of the video streams must be undertaken by several components of the system. In particular, the operator client 120 must decode video data for display to the operator. The operator can select multiple cameras for display simultaneously on multiple screens or multiple windows in a single screen.

The operator can also select to view recorded video data from the recording server 150. This means that the operator client 120 must simultaneously decode multiple streams of video data. Modern video surveillance systems can simultaneously display 20 or 30 video feeds simultaneously, or even more. Furthermore, the operator can change the selection of recorded or live camera feeds for display whenever they choose, and also the display can be automatically switched to display different camera feeds based on detection of events, for example motion. Thus, the operator client 120 needs to be able to handle the decoding of large numbers of constantly changing video decoding processes, or threads.

Decoding of video is also necessary in other components of the system. For example, decoding may be necessary in the recording server 150 in order to carry out analytics such as motion detection or facial recognition. If a separate analytics server is provided, then decoding may be necessary to carry out certain analytics processes. Furthermore, the mobile server 140 may be decoding multiple streams of video data. For example, the mobile server 140 may decode the original video data (H264 or H265), resize the images to a smaller size and stream the data to mobile devices as JPEG. The present invention is applicable to any component of the video surveillance system in which multiple streams of video data are being simultaneously decoded, although variations may be made in the method depending on where it is implemented, depending on the capabilities of the system.

The recording server 150 or the operator client 120 will include a CPU, and video decoding can be carried out by software running on the CPU. However, video decoding can be carried out more efficiently by hardware devices or GPUs (graphic processing units). Therefore, the efficiency of video decoding can be improved by providing hardware acceleration ie providing a plurality of hardware devices dedicated to video decoding. Hardware acceleration also increases the number of streams that can be decoded simultaneously.

The present invention is implemented in a video surveillance system in which a CPU is supplemented by a plurality of hardware decoder devices, so that decoding can be carried out by both software and hardware.

The present invention will be described particularly with reference to an embodiment of a system including at least one NVIDIA GPU, and an Intel GPU.

Different hardware devices might have different capabilities, both in terms of speed and capacity but also in their capability to decode different codec standards (eg JPEG, H.264 or H.265). This might be different between different types of device (ie Intel vs NVIDIA) or between different generations of the same type of device.

An embodiment of the load balancing method will be described in more detail with reference to FIG. 2, which is a flow diagram illustrating the load balancing method.

First, the load balancing process will be described in relation to the allocation of a new decoding process to the software/hardware resources. This may be at the start up of the system, or, for example if the system is the operator client 120, it may be when the operator selects a new camera to view video from, or a new recorded stream to view.

In step S100, a list of suitable hardware devices is compiled for the new decoding process. This comprises finding hardware devices in the system which are suitable for carrying out the decoding, based on the type of hardware device and the encoding type. Each process may also include an implementation request which may limit which type of hardware device the process can be sent to.

The following implementation requests are possible in the present embodiment in which a plurality of NVIDIA devices and an Intel GPU are present:

AutoNvidia=the process can run on NVIDIA, Intel GPU or software

OnlyNvidia=the process can only run on NVIDIA or software

OnlyIntel=the process can only run on Intel GPU or software

Also, the capabilities of the particular hardware devices are taken into account eg some hardware devices may not be able to decode JPEG, or may be able to decode H264 but not H265.

Thus, step S100 generates a list of suitable hardware devices for the decoding process.

In this embodiment of the invention, the loads of the hardware decoding devices are continuously monitored by utilisation gathering threads at step S600. One thread is provided for each type of hardware device. So in the present embodiment, there is one utilisation thread continuously monitoring the loads of all the NVIDIA devices. With respect to the Intel GPU, this is provided as a separate chip inside the CPU and it is not straightforward to directly monitor the load of the Intel GPU. Therefore, a utilisation thread is provided to monitor the CPU load which indirectly monitors the load of the Intel GPU.

In step S200, the current loads of all of the suitable devices are determined. For each hardware device, it is determined whether the load is less than a threshold, and the suitable decoder devices are selected having a current load less than the threshold to create a list of potential devices 10, and a list of overloaded devices 20 is selected having a load greater than or equal to the threshold.

If a device has a load less than a threshold, an additional check may also be carried out which estimates whether adding one more decoding thread to the device will overload it. If so, then the device is put into the overloaded list. For example, if a device has a threshold of 90% load, and the current load is 80% with 5 decoding threads, it can be estimated that adding one more thread will push the load over the 90% threshold.

The threshold may be different for each type of device, or even for each individual device. The threshold can also include more than one parameter.

For example, in the present embodiment the Intel threshold is set at 42%, and the NVIDIA threshold is set at 90% VideoEngine load, 90% GPU load and 80% memory load.

There may be more than one threshold used in selecting the devices for inclusion in the potential list and the overloaded list. The potential list may be all of the devices with a load less than a first threshold, and the overloaded list may be the devices with a load equal to or more than the first threshold and less than a second threshold. Devices with a load greater than or equal to the second threshold may not be included in either list. The thresholds may be different for different types of devices, or even for individual devices.

For example, for Intel devices the first threshold may be 42%, and the second threshold may be 70%. If the CPU is below 42% then the Intel GPU is listed as a potential device. If 42% to 70%, it is listed as an overloaded device. If 70% or over, it does not appear on either list. Likewise, for NVIDIA there may be a "hard cap" of memory at 80%. If memory is 80% or over, the device is excluded from either the potential list or the overloaded list.

At step S300, a decoder device is selected from the potential list 10, the overload list 20 or the decoding process is sent to be carried out by software on the CPU. The selection process will be described later in more detail with reference to FIG. 5.

In the present embodiment, the load balancing is also carried out during runtime with respect to decoding processes that are already running. For a process already running on a current decoder, step S500 determines whether load balancing should be attempted. If yes, then the load balancing steps described above are carried out on the process already running, which may result in the process being moved to another device, as described in more detail below with reference to FIG. 5. If the step S500 determines that load balancing should not occur, the process continues running on the current decoder until the next check on whether load balancing should be attempted. Each decoding process will attempt to check whether load balancing should be attempted every time a key frame (I frame) is reached. But load balancing can only be carried out on one decoding process at a time.

Figure 3:
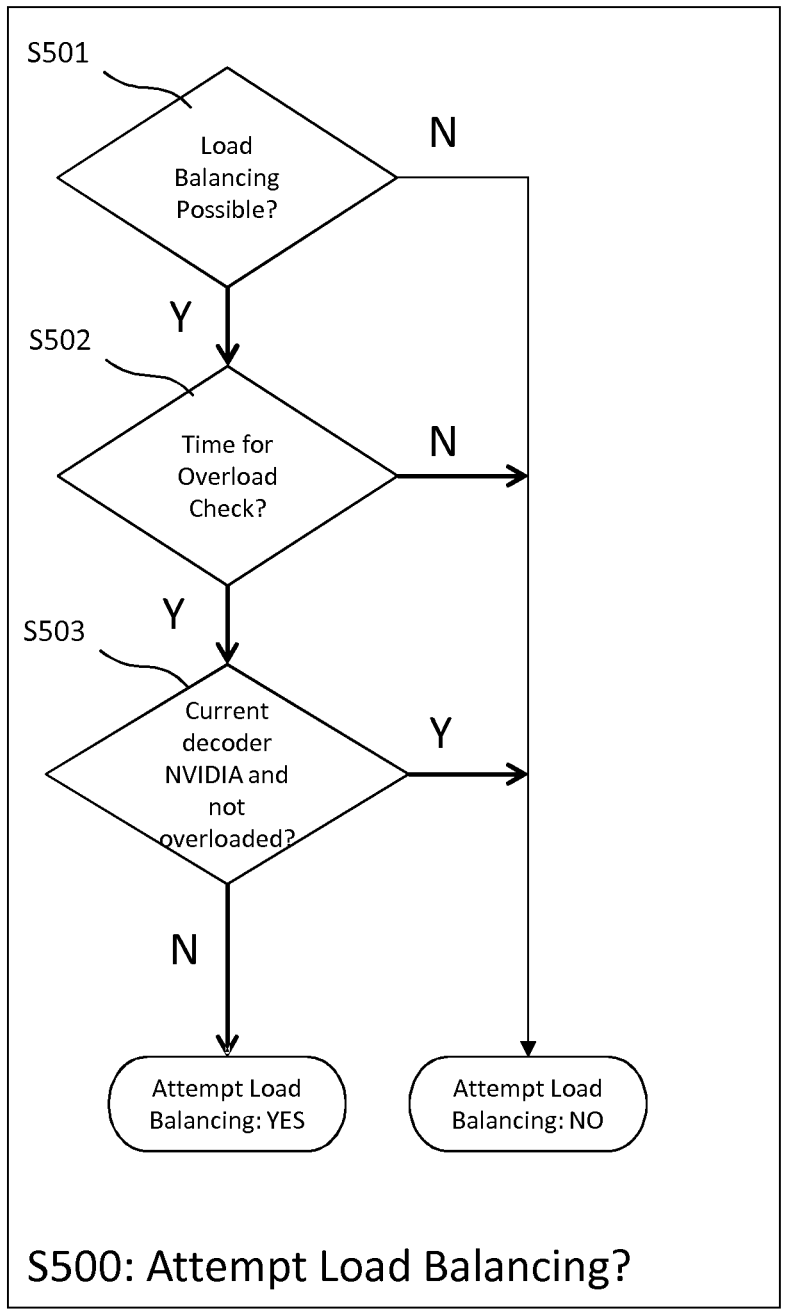
FIG. 3 is a flowchart illustrating in more detail the step of deciding whether to attempt load balancing during runtime.

FIG. 3 is a flow chart which shows in more detail the step S500 of determining whether load balancing should be carried out on a decoding process which is running on a current decoder. The first step S501 is to determine whether load balancing is possible. This step will be described in more detail with reference to FIG. 4, but the purpose of this step is to look at any restrictions placed on which decoders can be used for the particular process, look at what decoders are available on the system and the rules applied in the load balancing process and determine whether it might be possible to move the decoding process to another device.

If step S501 determines that load balancing is possible, then in step S502, it is checked whether at least a predetermined time has elapsed since load balancing was last carried out on the decoding process. Additionally, the process must reach an I frame in the video stream, at which point the load balancing will occur. In the present embodiment, the predetermined time is 4 seconds and when an I frame is reached.

In step S503 it is determined whether the current decoder is NVIDIA and not overloaded. If this is the case then load balancing is not carried out, because NVIDIA is the preferred decoder and if a process is running on an NVIDIA device which is not overloaded, then it is not considered necessary or desirable to move the process.

Figure 4:
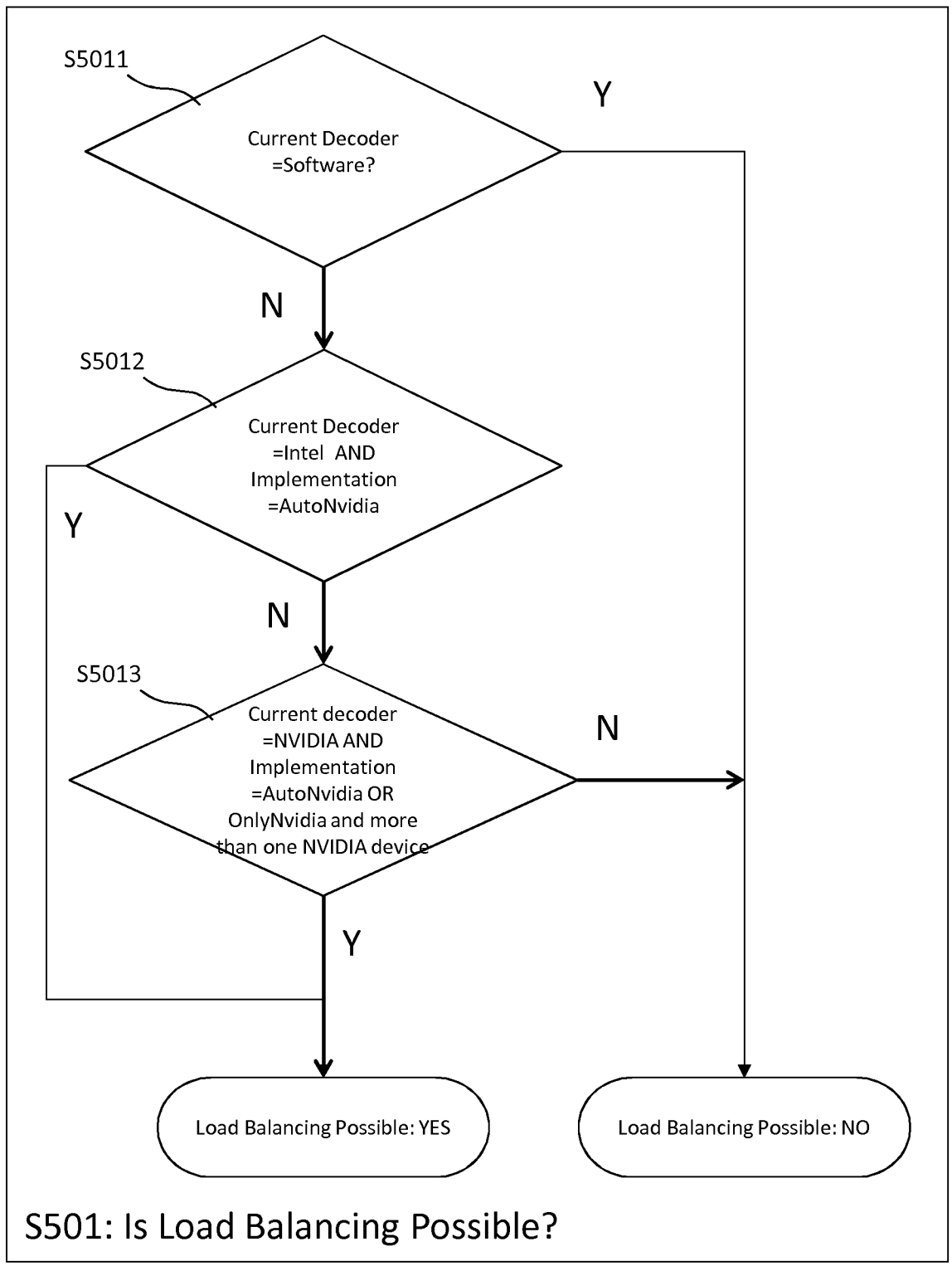
FIG. 4 is a flowchart illustrating in more detail the step of deciding whether load balancing is possible.

FIG. 4 shows in more detail how step S501 of determining whether load balancing is possible is carried out.

In step S5011, it is determined whether the process is currently running on software (ie the current decoder is software). If so, then it is determined that load balancing is not possible. It may be possible to provide the facility of moving processes from software to hardware in some embodiments, but in the present example this is excluded.

As discussed above, in this embodiment, each decoding process includes an implementation request, which limits which type of devices the process can run on.

The following implementation requests are possible in the present embodiment in which a plurality of NVIDIA devices and an Intel GPU are present:

AutoNvidia=the process can run on NVIDIA, Intel GPU or software

OnlyNvidia=the process can only run on NVIDIA or software

OnlyIntel=the process can only run on Intel GPU or software

In general, the default setting will be AutoNvidia, but the other implementation requests may also be set.

In step S5012 it is determined if the current decoder is Intel and the Implementation is AutoNvidia. This means that the implementation request would allow the process to be moved and therefore load balancing is possible.

In step S5013, it is determined if the current decoder is NVIDIA and the implementation is AutoNvidia, or OnlyNvidia and more than one NVIDIA device is present. In the first case, the process would be moveable to Intel or another NVIDIA device. In the second case, the process can only be moved to another NVIDIA device so there must be another NVIDIA device for load balancing to be possible.

Figure 2:
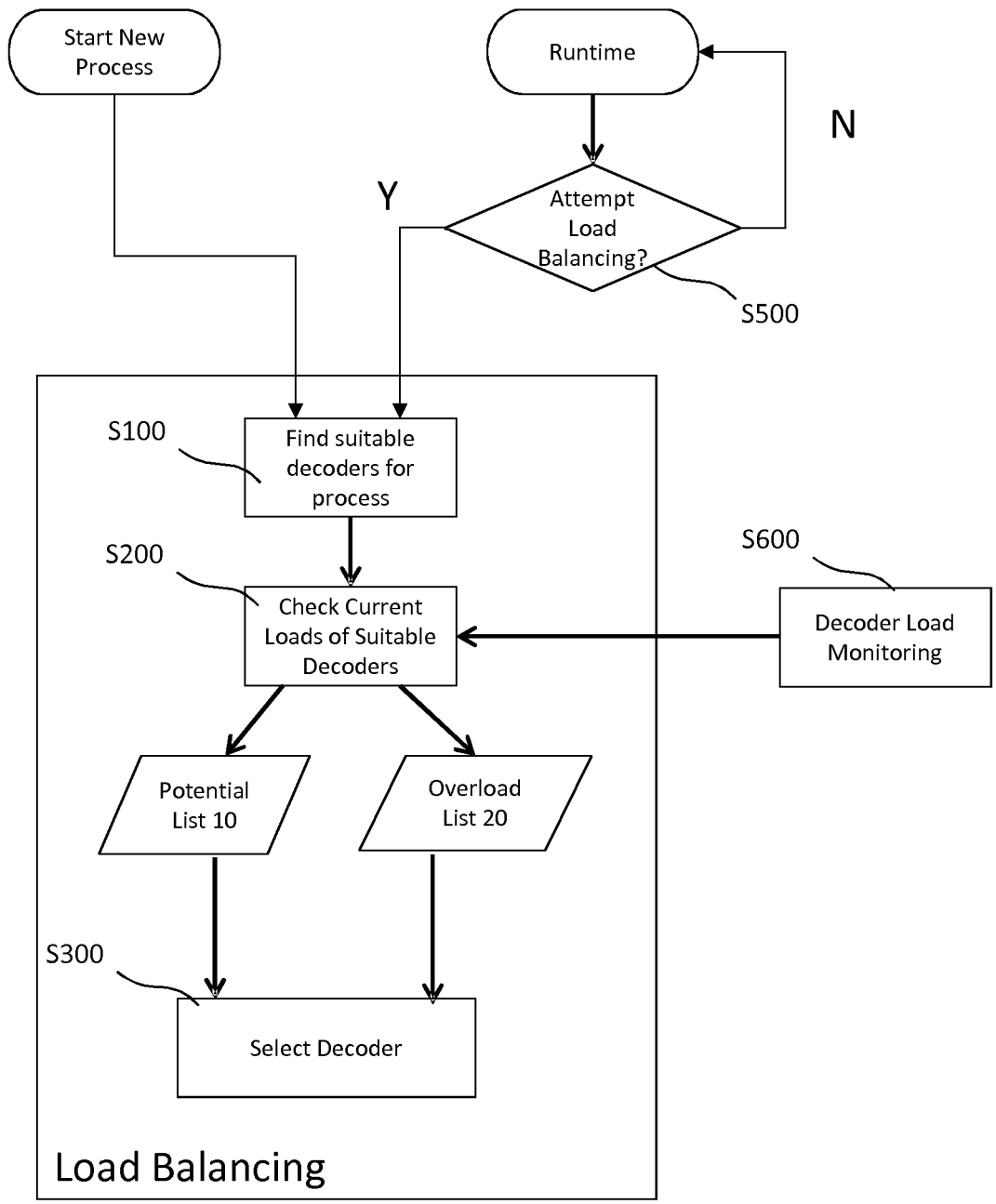
FIG. 2 is a flowchart illustrating a load balancing method.

Therefore, the method of FIG. 4 returns a result of whether load balancing is possible for a particular decoding process in step S501 of FIG. 3, and the method of FIG. 3 returns a result of whether load balancing should be attempted on the decoding process in step S500 of FIG. 2.

In an alternative embodiment to the method of FIG. 4, the method of determining whether load balancing is possible may simply comprise the step S5011 of determining if the current decoder is software, and if yes, then determining that load balancing is not possible, and if no (ie if the current decoder is any hardware device) then load balancing is possible.

Figure 5:
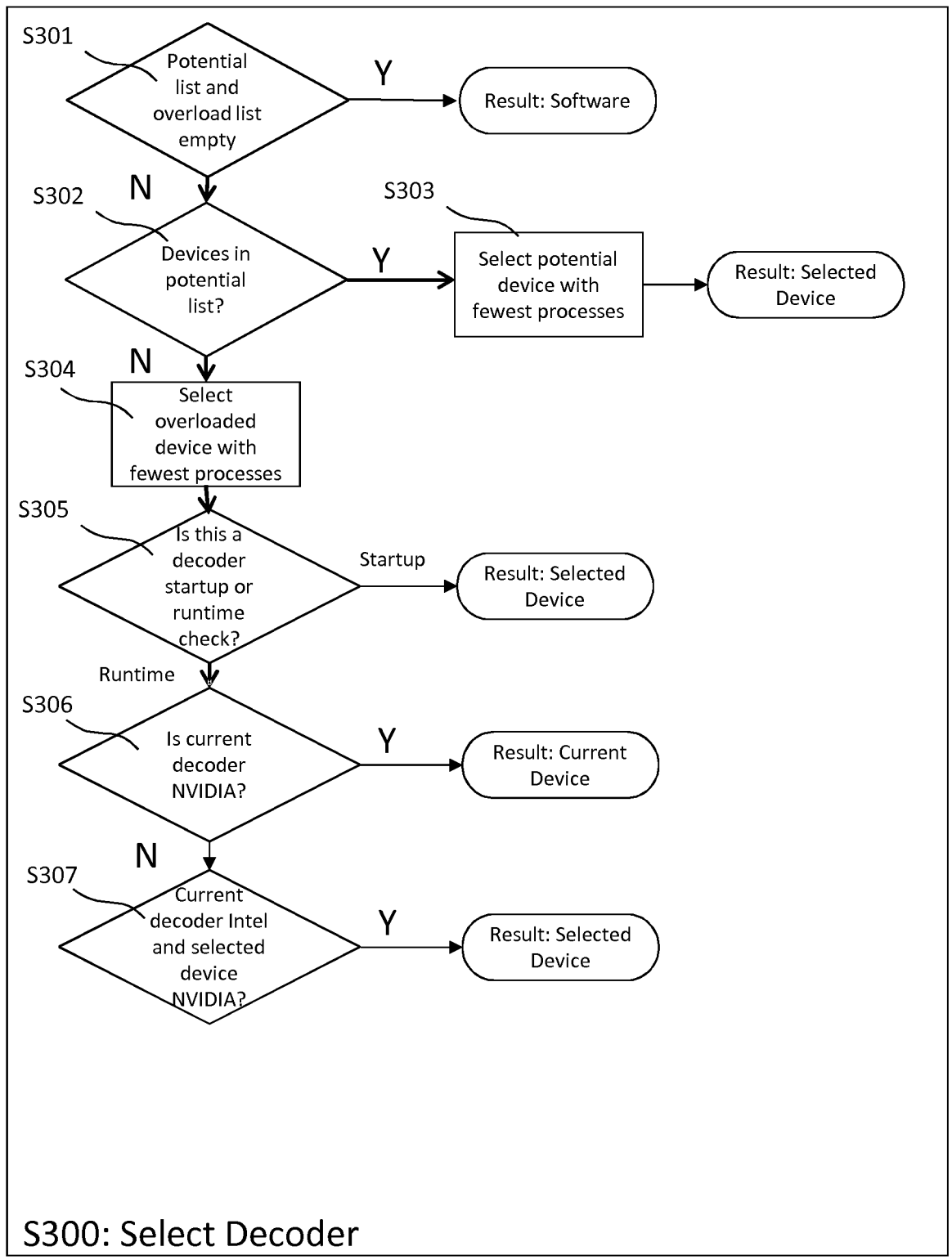
FIG. 5 is a flowchart illustrating in more detail the step of selecting a decoder.

FIG. 5 shows in more detail the step S300 of selecting a decoder from the potential list 10 and the overloaded list 20. In step S301 it is determined whether both lists are empty ie there are no potential or overloaded hardware devices that meet the criteria for being a suitable device. If this is the case then the process is sent to software for decoding.

In step S302, the potential list 10 is consulted, and if there are devices in the potential list 10, then at step S303, the potential device with the fewest processes already running on it is selected.

Therefore, the potential list 10 includes hardware devices which may be of more than one type (eg Intel and NVIDIA) which meet the load threshold criteria. For selection, the number of processes running on each device is considered, and the device with the fewest processes is selected. Therefore, for example, if the NVIDIA threshold is 90% and there are two NVIDIA devices N1 with 50% load and 5 decoding threads, and N2 with 60% load and 4 decoding threads, then N2 will be selected.

If there are no devices in the potential list 10, then the overload list 20 is consulted at step S304, and the device on the overload list 20 with the fewest threads is selected.

At step S305, it is considered whether the load balancing is being carried out at the startup of a new decoding process or during runtime. If this is load balancing at startup, then there is no "current decoder" to consider, so the new decoding process is sent to the selected device.

If the load balancing is being carried out during runtime, then steps S306 and S307 consider the current decoder. Step S306 determines if the current decoder is NVIDIA. If it is, then the process remains on the current decoder. This is because it is preferable for a thread to remain on an overloaded NVIDIA device than go to an overloaded Intel device, and if a thread is moved from one overloaded NVIDIA device to another overloaded NVIDIA device then a "ping pong" situation may arise whereby a thread is moved backwards and forwards between two NVIDIA cards in subsequent load balancing processes.

Step S307 determines if the current decoder is Intel and the selected device is NVIDIA. In this situation, it is preferable for a thread to move to an overloaded NVIDIA device rather than remain on an overloaded Intel device (the Intel device must be overloaded or it would have appeared on the potential list 10). Therefore the decoding process is moved to the selected NVIDIA device.

In a variation on the present embodiment, a blacklisting facility can be provided, which takes into account devices that are malfunctioning and excludes them from the load balancing logic. This takes place in step S100, whereby blacklisted devices are excluded from selection as suitable decoding devices. The exclusion can be for a device, or for a device in relation to a specific codec. For example, a system includes NVIDIA 1 (H264 and H265) and NVIDIA 2 (H264). NVIDIA 1 can become blacklisted for only H264, but still be selectable as a suitable device for an H265 process. Blacklisting can occur automatically, for example after a predetermined number of failures.

The present invention provides a method which distributes new decoding processes amongst the hardware and software resources taking into account which hardware devices are suitable for the processes whilst prioritising the use of hardware resources.

The invention can optionally operate in a way which prioritises one type of hardware device over another.

Preferred embodiments of the invention further provide load balancing of decoding processes which are already running on the system by carrying out periodic checks of whether load balancing should be carried out. Processes can be moved to different hardware devices to balance the processing load across the different hardware devices, in accordance with preset thresholds and preferences.

By continuously monitoring the loads of the various hardware devices, and through regularly carrying out load balancing, the system is able to quickly stabilise and react to changing loads, for example when an operator changes a selection of video feeds to view, or when a system starts up.

Second Embodiment

A second embodiment of the load balancing method will be described in more detail with reference to FIGS. 2 and 6 to 8. The main difference between the second embodiment and the first embodiment is that, in the second embodiment, it is possible for decoding processes to be moved from hardware resources to software AND vice versa.

In the first embodiment, moving decoding processes from hardware to software was possible, but NOT vice versa (see step S5011 in FIG. 4).

Figure 6:
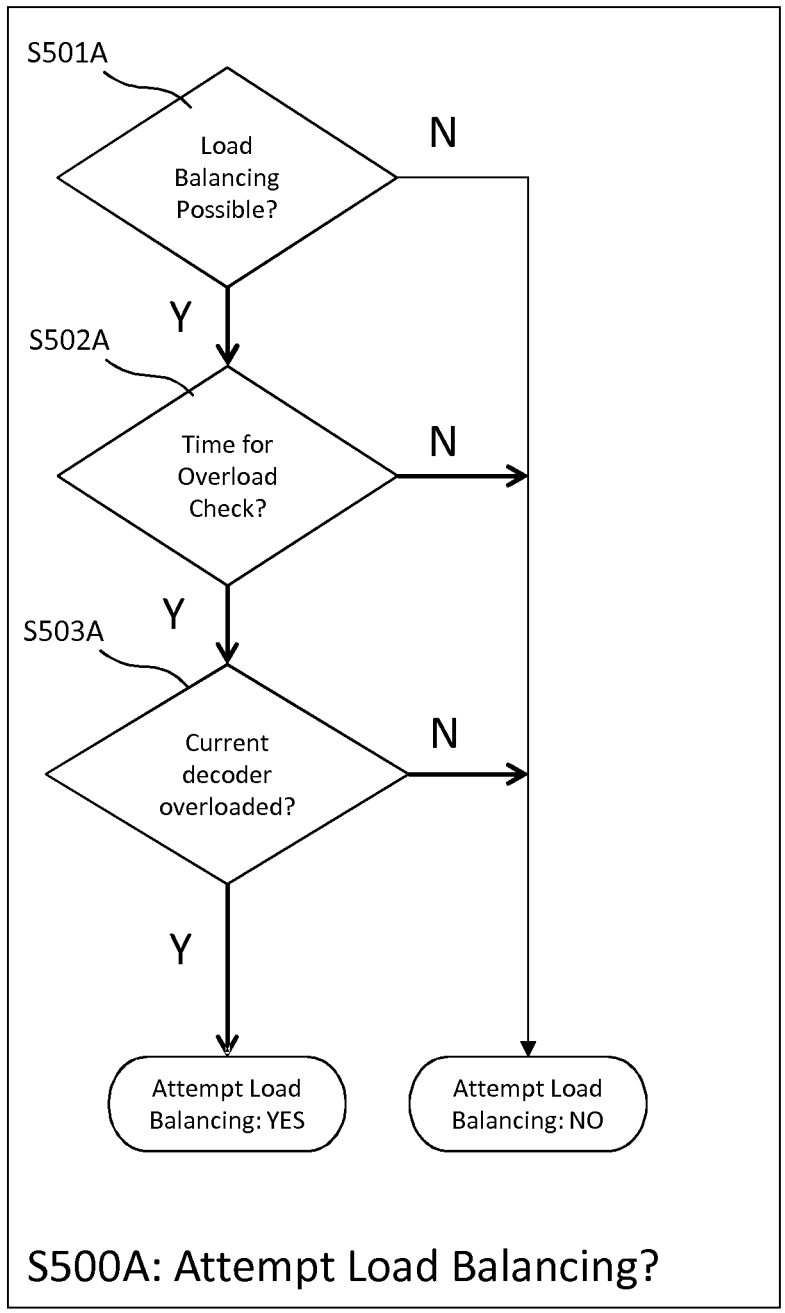
FIG. 6 is a flowchart illustrating in more detail the step of deciding whether to attempt load balancing during runtime in a second embodiment.
Figure 7:
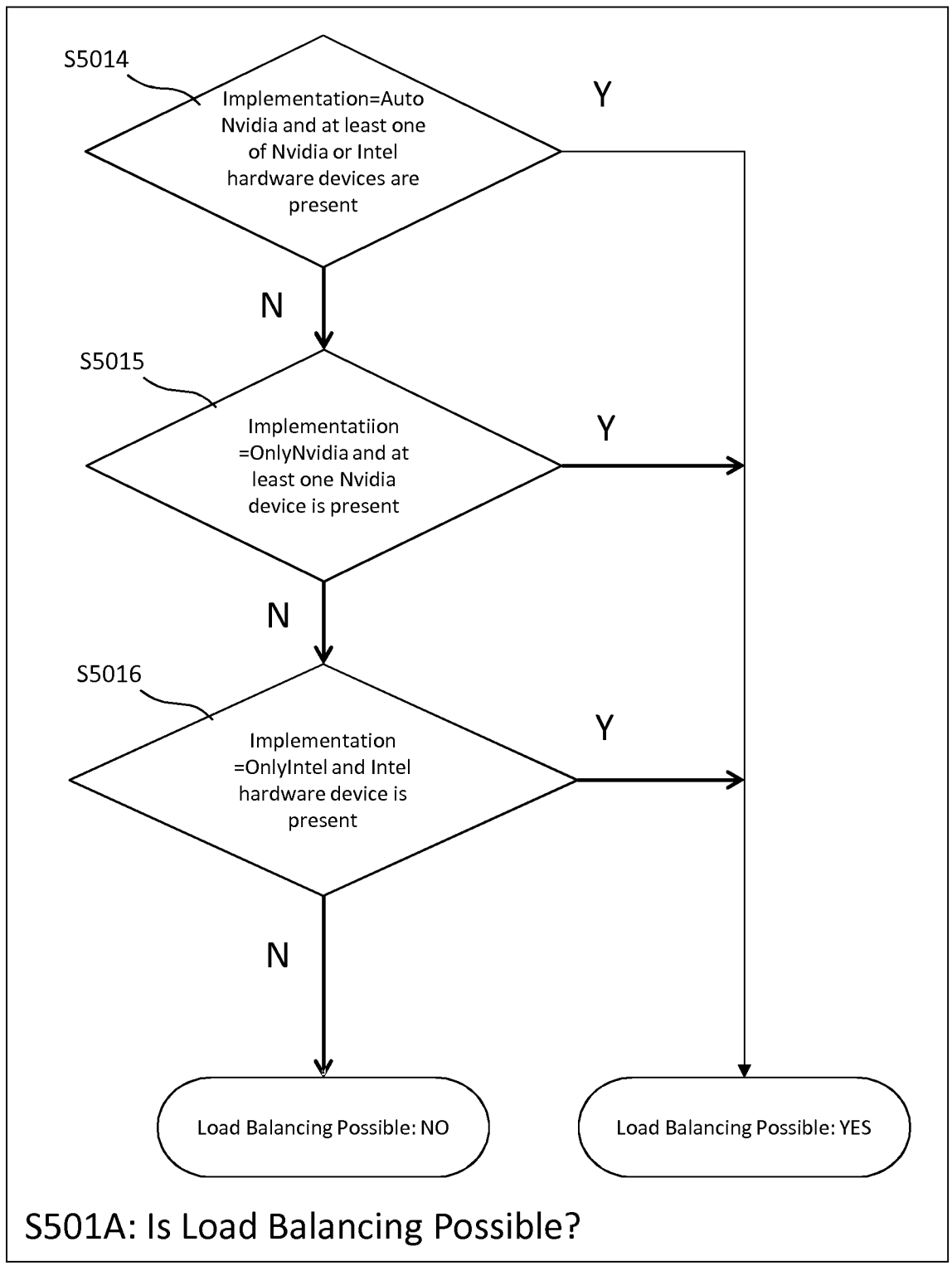
FIG. 7 is a flowchart illustrating in more detail the step of deciding whether load balancing is possible in the second embodiment.
Figure 8:
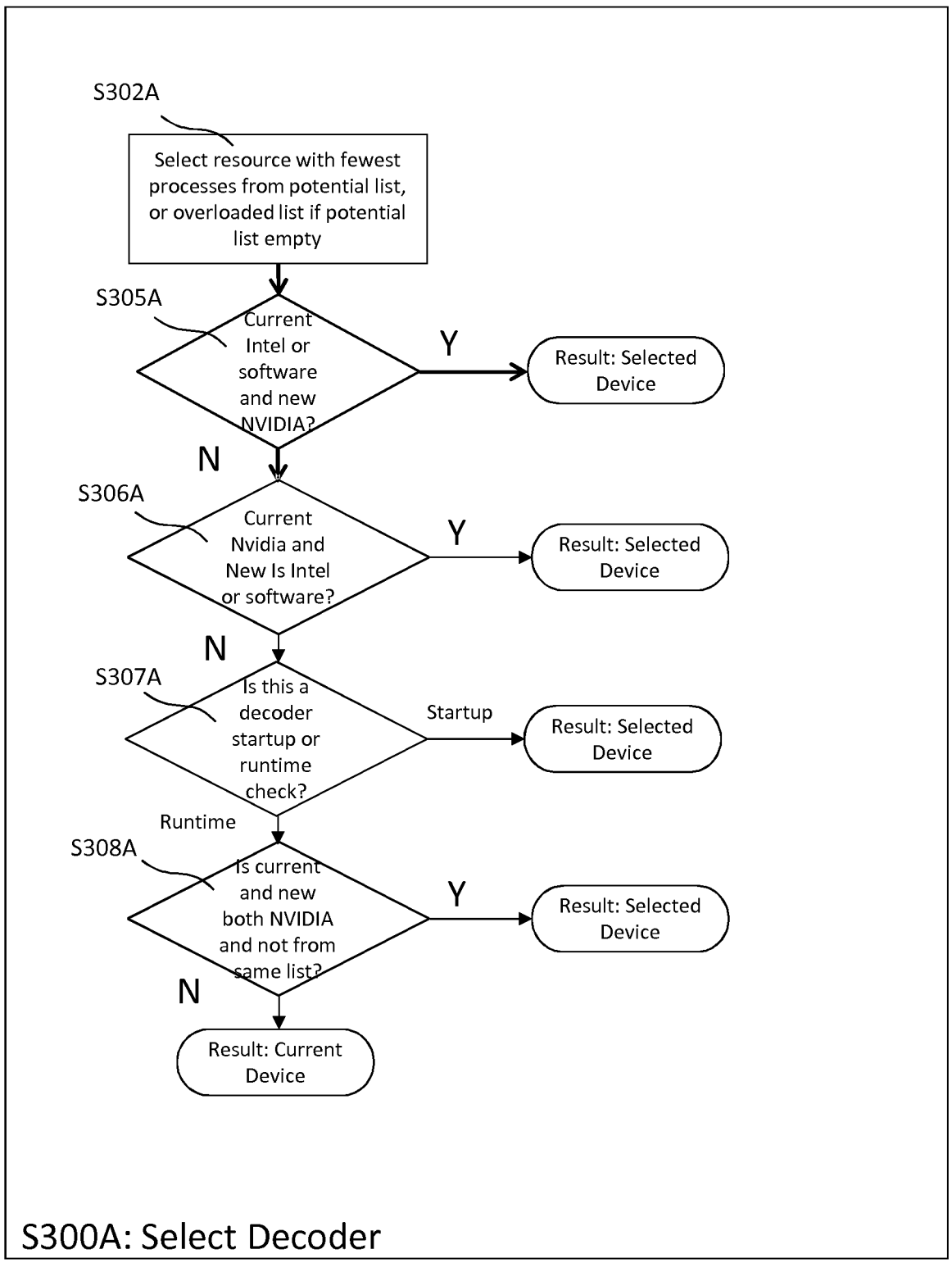
FIG. 8 is a flowchart illustrating in more detail the step of selecting a decoder in the second embodiment.

With respect to FIG. 2, the overall process is the same as the first embodiment. The differences lie in the logic in steps S100 to S300 which allows processes to be moved from software to hardware devices as well as vice versa, and these differences are shown in FIGS. 6 to 8.

In the second embodiment, there are particularly differences in the logic used for populating the Potential List 10 and the Overload List 20.

With reference to FIG. 2, as in the first embodiment, when a new process is started, in step S100, a list of suitable hardware and software decoders is compiled for the new decoding process. This comprises finding hardware and software resources in the system which are suitable for carrying out the decoding, based on the type of hardware/software resource and the encoding type. Each process may also include an implementation request which may limit which type of hardware/software resource the process can be sent to.

The implementation requests are the same as in the first embodiment when a plurality of NVIDIA devices and an Intel GPU are present:

AutoNvidia=the process can run on NVIDIA, Intel GPU or software

OnlyNvidia=the process can only run on NVIDIA or software

OnlyIntel=the process can only run on Intel GPU or software

Also, the capabilities of the particular hardware devices are taken into account eg some hardware devices may not be able to decode JPEG, or may be able to decode H264 but not H265.

Thus, step S100 generates a list of suitable hardware and software resources for the decoding process.

As in the first embodiment of the invention, the loads of the hardware decoding devices are continuously monitored by utilisation gathering threads at step S600. One thread is provided for each type of hardware device. So in the present embodiment, there is one utilisation thread continuously monitoring the loads of all the NVIDIA devices. With respect to the Intel GPU, this is provided as a separate chip inside the CPU and it is not straightforward to directly monitor the load of the Intel GPU. Therefore, a utilisation thread is provided to monitor the CPU load which indirectly monitors the load of the Intel GPU.

In step S200, the current loads of all of the suitable resources are determined.

In the second embodiment, the logic for populating the Potential List 10 and the Overload List 20 is different from the first embodiment, and also varies depending on the type of resource.

For the process in question, if NVIDIA is a suitable resource for the process (ie if the Implementation Request is OnlyNvidia or AutoNvidia), then first the NVIDIA devices are checked and allocated to either the Potential list 10 or the Overload List 20. The selection process for the NVIDIA devices is the same as for the first embodiment.

For each NVIDIA device, it is determined whether the load is less than a threshold, and the NVIDIA devices are selected having a current load less than the threshold to add to the Potential List 10, and devices having a load greater than or equal to the threshold are added to the Overload List 20. If an NVIDIA device has a load less than a threshold, an additional check may also be carried out which estimates whether adding one more decoding thread will overload the device. If so, then the device is put into the overloaded list. For example, if an NVIDIA device has a threshold of 90% load, and the current load is 80% with 5 decoding threads, it can be estimated that adding one more thread will push the load over the 90% threshold.

There may be more than one threshold used in selecting the NVIDIA devices for inclusion in the potential list and the overloaded list. The potential list may be all of the NVIDIA decoders with a load less than a first threshold, and the overloaded list may be the decoders with a load equal to or more than the first threshold and less than a second threshold. Decoders with a load greater than or equal to the second threshold may not be included in either list.

For example, there may also be an upper limit for inclusion on the Overload List 20. For example, for NVIDIA there may be a "hard cap" of memory at 80%. If memory is 80% or over, the device is excluded from either the potential list or the overloaded list. Additionally, similar to the above description, there may be an estimation of whether adding one more thread to the device would push the load over the "hard cap".

For the Intel hardware and software decoding resources, the method for populating the Potential List 10 and the Overloaded List 20 is different from the first embodiment.

As discussed above with respect to the first embodiment, it is not possible to directly monitor the load of the Intel GPU. The Intel GPU is provided as a separate chip inside the CPU and it is not straightforward to directly monitor the load of the Intel GPU. Therefore, the CPU load is used to indirectly monitor the load of the Intel GPU.

First, it is determined which threshold to use, a high threshold or a low threshold. For example, the low threshold may be 42% and the high threshold may be 70%.

First, the potential list is checked, and if this is empty then the high threshold is used. This will occur if there are no NVIDIA devices present, or all of the NVIDIA devices are overloaded or have hit the hard maximum of memory.

It is further checked if the process being load balanced is currently running on Intel GPU. If this is the case, the high threshold is used.

In any other case, the low threshold is used.

The same logic is used for populating the lists for Intel GPU or software. The only difference is that if any Intel hardware resource is found for the specific codec (does not matter overloaded or not), then software is not added to either list as a resource. The result is that, in the second embodiment, either Intel GPU OR software can appear in the Potential or Overload list, but never at the same time as they use same resource (CPU) so it doesn't make sense to move from same overloaded resource to the same one.

At step S300, a decoder is selected from the potential list 10, the overload list 20. The selection process will be described later in more detail with reference to FIG. 8.

As in the first embodiment, the load balancing is also carried out during runtime with respect to decoding processes that are already running. For a process already running on a current decoder, step S500 determines whether load balancing should be attempted. If yes, then the load balancing steps described above are carried out on the process already running, which may result in the process being moved to another device, as described in more detail below with reference to FIG. 8. If the step S500 determines that load balancing should not occur, the process continues running on the current decoder until the next check on whether load balancing should be attempted. Each decoding process will attempt to check whether load balancing should be attempted every time a key frame (I frame) is reached. But load balancing can only be carried out on one decoding process at a time.

In the second embodiment, the detail of step S500 is different from that of the first embodiment (FIG. 3) and is shown in more detail in FIG. 6, and in the second embodiment will be designated as step S500A.

FIG. 6 is a flow chart which shows in more detail the step S500A of determining whether load balancing should be carried out on a decoding process which is running on a current decoder, in the second embodiment.

The first step S501A is to determine whether load balancing is possible. This step will be described in more detail with reference to FIG. 7, but the purpose of this step is to look at any restrictions placed on which decoders can be used for the particular process, look at what decoders are available on the system and determine whether it might be possible to move the decoding process to another resource.

If step S501A determines that load balancing is possible, then in step S502A, as in the first embodiment, it is checked whether at least a predetermined time has elapsed since load balancing was last carried out on the decoding process. Additionally, the process must reach an I frame in the video stream, at which point the load balancing will occur. As in the first embodiment, the predetermined time is 4 seconds and when an I frame is reached.

Step S503A differs from the first embodiment, in that it is determined whether the current decoder is overloaded, regardless of the decoder type, and load balancing is only attempted if the current decoder is overloaded. If the current decoder is not overloaded then load balancing is not attempted.

As mentioned above, the difference between the second embodiment and the first embodiment is that, in the second embodiment it is possible to move decoding processes from software to hardware. Therefore, the difference in step S503A prevents decoding processes from being unnecessarily moved back and forth between different decoders.

FIG. 7 shows in more detail how step S501A of determining whether load balancing is possible is carried out, in the second embodiment. This part of the method differs from the first embodiment, in which load balancing is not possible if the current decoder is software (step S5011 of FIG. 4).

As in the first embodiment, each decoding process includes an implementation request, which limits which type of devices the process can run on.

The following implementation requests are possible in the present embodiment in which a plurality of NVIDIA devices and an Intel GPU are present:

AutoNvidia=the process can run on NVIDIA, Intel GPU or software

OnlyNvidia=the process can only run on NVIDIA or software

OnlyIntel=the process can only run on Intel GPU or software

In general, the default setting will be AutoNvidia, but the other implementation requests may also be set.

In the second embodiment, the step S501A considers the implementation request for the process and the resources available on the system. Because in this embodiment it is possible to move a process from software to hardware and vice versa, it is not necessary to consider the current decoder, as there will always be an option for moving the process, provided there are hardware resources available in the system that match the implementation request.

In step S5014 it is determined if the Implementation is AutoNvidia, and at least one of Nvidia or Intel hardware devices are present in the system. If Yes, this means that the process has at least one option besides software that it can run on, and therefore load balancing is possible.

In step S5015 it is determined if the Implementation is OnlyNvidia, and at least one Nvidia hardware device is present in the system. If Yes, this means that the process has at least one option besides software that it can run on, and therefore load balancing is possible.

In step S5016 it is determined if the Implementation is OnlyIntel, and an Intel hardware decoder is present in the system. If Yes, this means that the process has at least one option besides software that it can run on, and therefore load balancing is possible.

Therefore, the method of FIG. 7 returns a result of whether load balancing is possible for a particular decoding process in step S501A of FIG. 6, and the method of FIG. 6 returns a result of whether load balancing should be attempted on the decoding process in step S500 of FIG. 2.

FIG. 8 shows in more detail the step S300A of selecting a decoder from the potential list 10 and the overload list 20, in the second embodiment.

In step S302A, the potential list 10 is consulted, and if there are devices in the potential list 10, then the potential device with the fewest processes already running on it is selected. If there are no resources in the potential list 10, the resource with fewest processes is selected from the overloaded list 20.

Therefore, for example, if the NVIDIA threshold is 90% and there are two NVIDIA devices in the potential list, N1 with 50% load and 5 decoding threads, and N2 with 60% load and 4 decoding threads, then N2 will be selected.

If there are no devices in the potential list 10, then the overload list 20 is consulted, and the resource on the overload list 20 with the fewest threads is selected.

Step S305A determines if the current decoder is Intel or software and the selected decoder is NVIDIA. If it is, then the process is moved to the selected device.

Step S306A determines if the current decoder is NVIDIA and the selected decoder is Intel or software. If it is, then the process is moved to the selected decoder.

At step S307A, it is considered whether the load balancing is being carried out at the startup of a new decoding process or during runtime. If this is load balancing at startup, then the new decoding process is sent to the selected device.

If the load balancing is being carried out during runtime, Step S308A determines if both the current decoder and the selected decoder are NVIDIA. If load balancing is being carried out then the current decoder will be overloaded. In this case, if the selected decoder is also from the overloaded list then it is not desirable to move the process, as this could result in a process continually being moved back and forth between two equally overloaded devices (a "ping pong" effect). Therefore, if both the current decoder and the selected decoder are NVIDIA and the devices are both from the same list, the process is not moved. If both the current decoder and the selected decoder are NVIDIA and are from different lists (ie current is overloaded, selected is potential) then the process is moved to the selected device.

Overall, the end result of the method of FIG. 8 is that the resource selected in step S302A is chosen for the process unless both the current decoder and the selected decoder are overloaded NVIDIA devices. In this case, the process remains on the current decoder.

As in the first embodiment, a blacklisting facility can be provided, which takes into account devices that are malfunctioning and excludes them from the load balancing logic. This takes place in step S100, whereby blacklisted devices are excluded from selection as suitable decoding devices. The exclusion can be for a device, or for a device in relation to a specific codec. For example, a system includes NVIDIA 1 (H264 and H265) and NVIDIA 2 (H264). NVIDIA 1 can become blacklisted for only H264, but still be selectable as a suitable device for an H265 process. Blacklisting can occur automatically, for example after a predetermined number of failures.

The present invention provides a method which distributes new decoding processes amongst the hardware and software resources taking into account which hardware devices are suitable for the processes whilst prioritising the use of hardware resources.

The invention can optionally operate in a way which prioritises one type of hardware device over another.

Preferred embodiments of the invention further provide load balancing of decoding processes which are already running on the system by carrying out periodic checks of whether load balancing should be carried out. Processes can be moved to different hardware devices to balance the processing load across the different hardware devices, in accordance with preset thresholds and preferences.

By continuously monitoring the loads of the various hardware devices, and through regularly carrying out load balancing, the system is able to quickly stabilise and react to changing loads, for example when an operator changes a selection of video feeds to view, or when a system starts up.

While the present invention has been described with reference to embodiments, it is to be understood that the invention is not limited to the disclosed embodiments. The present invention can be implemented in various forms without departing from the principal features of the present invention as defined by the claims.

The following statements form part of the description. The claims follow these statements and are labelled as such.

1. A load balancing method for video decoding in a system comprising resources for hardware and software decoding, wherein the resources for hardware decoding comprise a plurality of hardware decoder devices, the method comprising the steps of:

monitoring the loads of each of the hardware devices;
for a new decoding process, carrying out load balancing comprising the steps of:
determining which hardware devices are suitable for the new decoding process;
determining the current load of each of the suitable hardware devices;
for each suitable hardware device, determining if the current load is less than a threshold and selecting a list of potential devices having a current load less than the threshold and a list of overloaded devices having a load greater than or equal to the threshold;
if there are no suitable devices, then implementing the decoding process by software decoding;
if the list of potential hardware devices includes only one potential hardware device, then implementing the decoding process on the hardware device;
if the list of potential hardware devices includes more than one potential hardware device, then determining how many decoding processes are currently running on each potential hardware device, selecting the potential hardware device having the fewest processes and implementing the new decoding process on the selected potential hardware device.

2. The method according to statement 1, wherein if there are no potential hardware devices, but there are hardware devices in the overloaded list, the method comprises selecting the overloaded hardware device having the fewest processes.

3. The method according to statement 1 or 2, wherein the hardware decoder devices include a first type and a second type.

4. The method according to statement 3, wherein the threshold for determining whether a device is overloaded is different for each type of hardware decoder device and the threshold is higher for the first type of hardware device than the second type.

5. The method according to statement 3 or 4, wherein each process includes an implementation request which specifies which types of decoder the process can run on, and the step of determining which hardware devices are suitable for the new decoding process comprises checking the implementation request and selecting types of hardware devices according to the implementation request.

6. The method according to statement 5, further comprising carrying out the load balancing on a decoding process which is already running on a current decoder by:
determining whether load balancing is possible for the process based on the current decoder and the implementation request; and
if load balancing is possible, carrying out load balancing on the process.

7. The method according to statement 6, further comprising:
for the process which is already running, determining if the current decoder is a hardware decoder of the first type and whether the current decoder is overloaded and if the current decoder is of the first type and not overloaded, then not carrying out the load balancing.

8. The method according to statement 6 or 7, wherein for the process that is already running and the current decoder is a hardware decoder of the first type, in the load balancing if there are no potential hardware devices, but there are hardware devices in the overloaded list, the process remains on the current hardware device.

9. The method according to any of statements 6 to 8, wherein for the process which is already running, determining whether a predetermined time has elapsed since the thread was last considered for load balancing, and if the predetermined time has not elapsed, not carrying out the load balancing.

10. The method according to any one of statements 6 to 9, wherein for the process which is already running, the step of determining whether load balancing is possible based on the current decoder comprises determining that load balancing is not possible if the current decoder is software.

11. The method according to any one of statements 3 to 10, wherein the monitoring the loads of each of the hardware devices is carried out by a continuously running utilization thread for each type of hardware device.

12. The method according to any one of statements 3 to 11, wherein the first type of hardware decoder is an NVIDIA GPU and the second type of hardware decoder is an Intel GPU.

13. The method according to any one of the preceding statements, wherein the system is a video surveillance system.

14. A computer program which, when executed by a programmable apparatus, causes the apparatus to perform the method of any one of the preceding statements.

15. A system comprising resources for hardware and software video decoding, wherein the resources for hardware decoding comprise a plurality of hardware decoder devices, wherein the system is configured to carry out load balancing of decoding processes between the resources by:
monitoring the loads of each of the hardware devices;
for a new decoding process, carrying out load balancing comprising the steps of:
determining which hardware devices are suitable for the new decoding process;
determining the current load of each of the suitable hardware devices;
for each suitable hardware device, determining if the current load is less than a threshold and selecting a list of potential devices having a current load less than the threshold and a list of overloaded devices having a load greater than or equal to the threshold;
if there are no suitable devices, then implementing the decoding process by software decoding;
if the list of potential hardware devices includes only one potential hardware device, then implementing the decoding process on the hardware device;
if the list of potential hardware devices includes more than one potential hardware device, then determining how many decoding processes are currently running on each potential hardware device, selecting the potential hardware device having the fewest processes and implementing the new decoding process on the selected potential hardware device.

The invention claimed is:
1. A load balancing method for video decoding in a video surveillance system which is configured to carry out a plurality of video decoding processes each corresponding to a stream of video data that originates from a different one of a plurality of video cameras, the system comprising resources for hardware and software decoding, wherein the resources for hardware decoding comprise a plurality of graphics processing units (GPUs) and the resources for software decoding comprise a video codec program module executable by at least one computer processing unit (CPU) core, the method comprising:
monitoring loads of the GPUs;
for a new decoding process, carrying out load balancing comprising:

determining which GPUs are suitable GPUs for the new decoding process;
determining a current load of each of the suitable GPUs;
determining the suitable GPU as a potential GPU, if-when the current load of the suitable GPU is less than a threshold; and
determining the GPU as an overloaded GPU, when the current load of the GPU is greater than or equal to the threshold;
when there are no suitable GPUs, then carrying out the new decoding process by software decoding using the video codec program module executed by the at least one CPU core;
when there is only one potential GPU, then carrying out the new decoding process on the GPU;
when there are more than one potential GPU, then determining how many decoding processes are currently running on each potential GPU and carrying out the new decoding process on the potential GPU having the fewest decoding processes, wherein each decoding process corresponds to a stream of video data that originates from a different one of the plurality of video cameras.

2. The method according to claim 1, wherein when there are no potential GPUs, but there are over loaded GPUs, the method comprises selecting the overloaded GPU having the fewest processes for the new decoding process.

3. The method according to claim 1, wherein the GPUs include a first type and a second type different from the first type.

4. The method according to claim 3, wherein the threshold for determining whether the GPU is the overloaded GPU is different for each type of GPU and the threshold is higher for the first type of GPU than the second type.

5. The method according to claim 1, wherein the suitable GPUs are determined by an implementation request for the new decoding process.

6. The method according to claim 5,
wherein the GPUs include a first type and a second type different from the first type,
wherein the implementation request specifies which types of decoder the process can run on, and the determining which GPUs are suitable for the new decoding process comprises checking the implementation request and selecting types of GPUs according to the implementation request.

7. The method according to claim 5, further comprising carrying out the load balancing on a decoding process which is already running on a current decoder by:
determining whether load balancing is possible for the process based on the current decoder and the implementation request; and
when load balancing is possible, carrying out load balancing on the process.

8. The method according to claim 7, further comprising:
for the process which is already running, determining when the current decoder is a GPU of the first type, and when the current decoder is a GPU of the first type and not the overloaded GPU, then not carrying out the load balancing.

9. The method according to claim 7, wherein for the process that is already running and the current decoder is a GPU of the first type, in the load balancing when there are no potential GPUs, but there are overloaded GPUs, the process remains on the current GPU.

10. The method according to claim 7, wherein for the process which is already running, determining whether a predetermined time has elapsed since the thread was last considered for load balancing, and when the predetermined time has not elapsed, not carrying out the load balancing.

11. The method according to claim 7, wherein for the process which is already running, the determining whether load balancing is possible based on the current decoder comprises determining that load balancing is not possible when the current decoder is software.

12. The method according to claim 3, wherein the monitoring the loads of each of the GPUs is carried out by a continuously running utilization thread for each type of GPU.

13. The method according to claim 3, wherein the first type of GPU is a GPU of a first manufacturer and the second type of GPU is a GPU of a second manufacturer which is different from the first manufacturer.

14. The method according to claim 1, wherein the suitable GPUs are determined by capability of carrying out the new decoding process.

15. A non-transitory computer readable storage medium storing a program to cause a computer to execute the load balancing method of claim 1.

16. A video surveillance system configured to carry out a plurality of video decoding processes each corresponding to a stream of video data that originates from a different one of a plurality of video cameras, the system comprising resources for hardware and software video decoding, wherein the resources for hardware decoding comprise a plurality of graphics processing units (GPUs), and the resources for software decoding comprise a video codec module executable by at least one computer processing unit (CPU) core, wherein the system is configured to carry out load balancing of the decoding processes between the resources by:
monitoring loads of the GPUs;
for a new decoding process, carrying out load balancing comprising:
determining which GPUs are suitable GPUs for the new decoding process;
determining a current load of each of the suitable GPUs;
determining the suitable GPU as a potential GPU, when the current load of the suitable GPU is less than a threshold; and
determining the GPU as an overloaded GPU, when the current load of the GPU is greater than or equal to the threshold;
when there are no suitable GPUs, then carrying out the new decoding process by software decoding using the video codec program module executed by the at least one CPU core;
when there is only one potential GPU, then carrying out the new decoding process on the GPU;
when there are more than one potential GPU, then determining how many decoding processes are currently running on each potential GPU and carrying out the new decoding process on the potential GPU having the fewest decoding processes, wherein each decoding process corresponds to a stream of video data that originates from a different one of the plurality of video cameras.

* * * * *